Oct. 30, 1956   J. C. BAKER   2,768,523
MEASURING DEVICE FOR DOUGH
Filed June 27, 1952
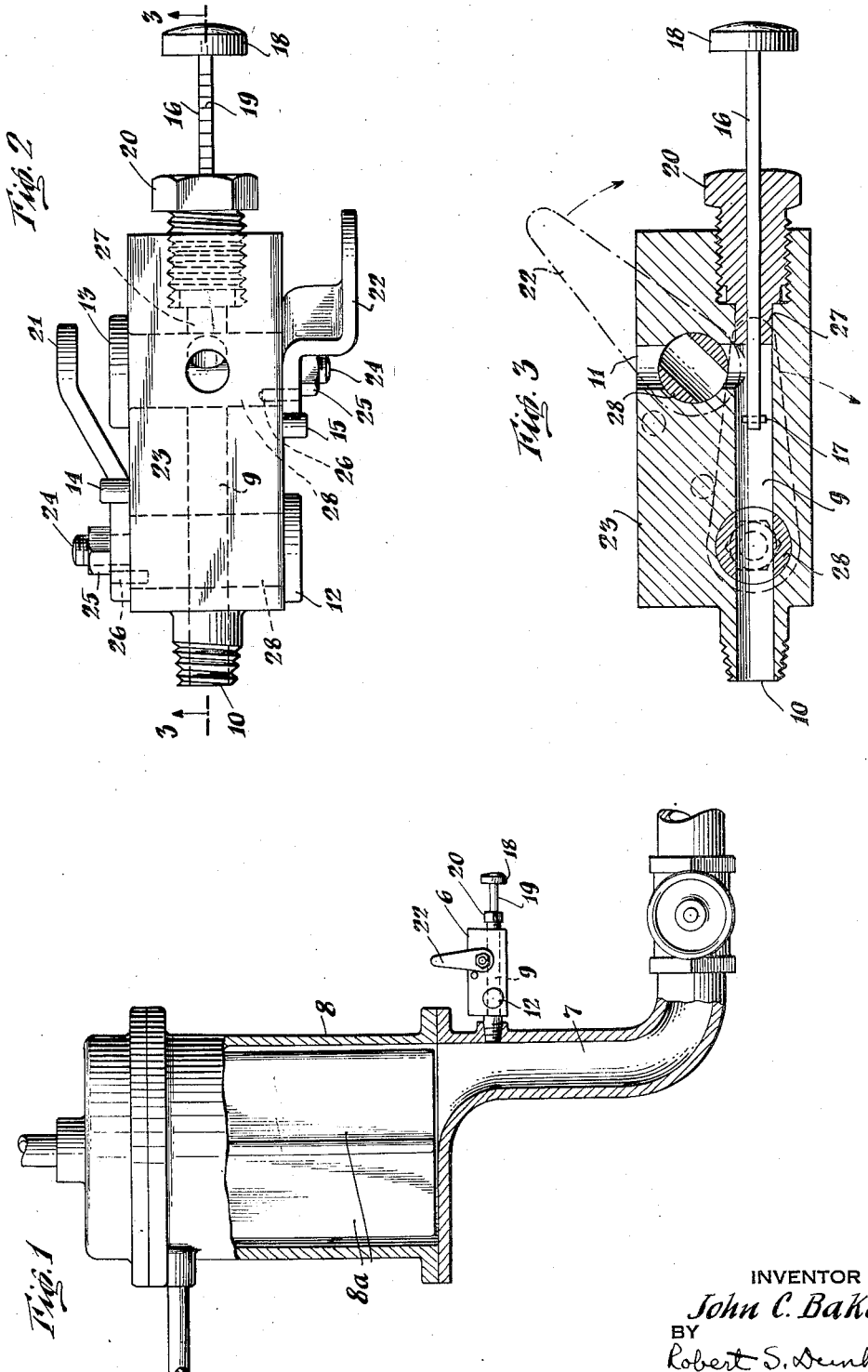
INVENTOR
John C. Baker
BY
Robert S. Dunham
ATTORNEY

United States Patent Office 2,768,523
Patented Oct. 30, 1956

2,768,523

MEASURING DEVICE FOR DOUGH

John C. Baker, Hewitt, N. J., assignor to Baker Process Company, Belleville, N. J., a corporation of New Jersey Application June 27, 1952, Serial No. 295,959

4 Claims. (Cl. 73—19)

This invention relates to the art of baking and is specifically designed to provide a method and apparatus for determining the volume of free gas in a sample of dough.

In bread making and other baked goods manufacture, it has been rather difficult to obtain constantly uniform results by reason of variations in flour quality and similar conditions beyond the control of the baker. Even though from experience he may know fairly well how to produce a certain quality of bread, such conditions as just mentioned may produce uncertainty of the dough mixing and require examination of a finished lot of bread to learn whether any changes of ingredients or process are necessary; meanwhile, much off-quality bread may have been produced. While in contrast to above difficulties of conventional practice, effective control and predictability have been attained in the continuous dough-mixing procedure and apparatus described and claimed in my copending patent application, Ser. No. 177,418, filed August 3, 1950, it is nevertheless often important in the latter operations to measure various conditions in the mixer. In all cases, I have found that the free gas content of the dough being mixed is a very significant factor, which bears, for instance, on the grain size and structure of the ultimate loaf or other article. The present invention, designed to provide ascertainment of dough gas content, is thus capable of advantage in reducing the uncertainty of baking operations generally, and is of special value in systems of the sort embodied in my above-cited application when it is possible to regulate the mixing process (e. g. in speed of agitation or in pressure) essentially immediately for correction of an undesired gas content condition.

An object of this invention is, therefore, to teach a rapid and effective method of measuring the free gas content of any given sample of dough.

Another object of this invention is to provide a simple, rugged, easy-to-operate, yet accurate device for measuring the free gas content in a given sample of dough.

A further object of this invention is to provide a device of the character described which may be used in conjunction with continuous systems for making dough, and especially continuous dough-making systems (e. g. for bread dough) of the character set forth in my aforesaid copending application, Ser. No. 177,418.

A more specific object of the invention is to provide a device of the character described, i. e. for measuring free gas content which may conveniently be located in direct connection to any desired tank, pipe, or other container wherein dough is being mixed, advanced or held, e. g. under pressure. More particularly, the device of the invention is adapted to test a sample of the dough, and can be arranged as just described, whereby a sample can be readily taken at any time, and as often as desired, and the free gas content of such sample may be quickly and simply measured.

Another object of this invention is specifically to provide a device which may be used in connection with a dough developing vessel of the character provided in my cited application, e. g. a tank in which the dough is continuously mixed and developed. In such process the dough continuously traversing the developer is preferably kept under a certain amount of pressure and for this reason the present invention is particularly useful. By having the present device located or connected at a suitable and convenient place in the dough developer tank or its outlet, it is possible to make tests at any time, of dough samples which are at the same pressure as the batch of dough being tested.

The features and principles of the invention may be readily understood from an effective embodiment described below by way of example, and shown in the accompanying drawings, in which:

Fig. 1 is a schematic showing of the device in one suitable location which is in the outlet pipe of a dough mixing or developing tank;

Fig. 2 shows a plan view, enlarged, of the device when oriented in the position shown in Fig. 1; and Fig. 3 shows a side view of the device chiefly in cross section and enlarged to the same scale as Fig. 2, taken along the line 3—3 looking in the direction of the arrows.

As illustrated in Fig. 1, the device 6 may be located in the outlet pipe 7 of a dough mixing or developing tank 8. As indicated previously, a dough developing tank, e. g. for use in my process, is one where dough is mixed and developed as it is advanced through the tank; that is, the dough is subjected to special agitating and mixing action which effects the desired, so-called development of the yeast-leavened dough. In the specific developing tank shown the paddle 8a (of which only one set is shown) are rotated or oscillated within the tank 8 by suitable gearing and drive connections (not shown). In apparatus such as this the dough is preferably advanced downwardly through the vessel, and there maintained, at a pressure at least somewhat above atmospheric. Unusual advantage has been achieved in arranging the impeller blades or paddles 8a with practically no clearance between them and the top and bottom surfaces of the developer chamber 8, such construction being most effective in preventing vertical dough circulation in the chamber; a desirable alternative arrangement of the discharge duct 7 (which should be as short as possible) is to lead it directly from a side wall of the chamber (instead of the bottom as shown) e. g. at a locality such that the lower interior surface of the duct is flush with the interior bottom surface of the chamber.

The device 6 of the present invention comprises structure providing a test chamber or space 9 opening to the outlet pipe 7 through a suitable valve and also having an outlet valve, such that when both valves are open the dough under pressure being advanced from the developer 8 will flow slowly into and through the test chamber. As described in detail hereinbelow, the device 6 includes a plunger adapted to be compressed, e. g. manually, after the chamber 9 has been filled with dough and the valves closed; the motion of the plunger drives the free gas of the dough into solution in the latter, so that the distance traveled by the plunger to its end point (the solution of all gas, leaving the confined dough mass incompressible) can be measured to represent the volume which had been occupied by the gas.

The device is preferably so built that all voids in the test space are swept free of the gas by the flow of dough before testing. Valves are of such construction that they do not alter the volume of the confined space upon closing; cocks having the same bore as the test chamber constitute one arrangement supplying these conditions. For sanitary reasons the device is preferably made out of stainless steel throughout, although other materials may be used where appropriate.

Figs. 2 and 3 illustrate the device in detail. The test chamber 9 has an inlet at 10 (opening to the dough discharge pipe 7) and an outlet at 11. There are two valves 12 and 13 which have stop pins 14 and 15 located so as to determine the fully open position of each of these valves. These valves are composed of cylindrical cores 28 which have over-sized ends or retaining heads located opposite to threaded portions 24. Through the cores 28 are bored holes of the same size and cross sectional shape as the chamber 9 and its outlet passage 11 respectively, in order that the volume of the test chamber will not vary upon closing of the valves. The stop pins are fastened to the main body 23 of the device 6 (which body is designated as 23 in Figs. 2 and 3) and act on valve handles 21 and 22 to limit their movement. The valve handles are fastened to the core of each valve by means of the threaded portions 24 and secured by hexagonal nuts 25. There are also pins 26 which insure positive, non-slip, connection between each valve handle and its respective valve core.

The device also includes a plunger 16 which is reciprocable in the chamber 9 through the closed end of the latter opposite the inlet 10 and which has a pin 17 located near the end of the plunger so that the plunger may not be pulled out too far. The plunger has a handle or knob 18 on its outer end for operating it, and on its shaft carries calibration marks 19 for indicating the distance it is moved from a position of complete withdrawal (to the limit of pin 17) that represents the starting point of a test operation. It will be understood that, if desired, lever or other force amplifying means (not shown) can be associated with the outer end of the plunger 16 to intensify the pressure applied to the dough sample under test. The plunger operates through a bushing 20 to move in the space formed by the chamber 9, the bushing being advantageously so constructed that its inner portion 27, which fits snugly into the end of the bore of the chamber, comes just tangent to the right angle portion or outlet 11 of the test chamber. In this manner there is essentially no space for immobilization or backing-up of dough as it flows through the chamber at the outset of taking a sample. The test chamber illustrated is preferably of a round cross section for each of manufacture and convenience of cleaning, although other cross sectional shapes can be employed without altering the function of the device.

As the developer 8 is used continuously mixing and delivering dough through the outlet pipe 7, the valves 12 and 13 of the test device are normally closed. When it is desired to take a measurement of the free (undissolved) gas content of the dough (i. e. under the actual conditions of pressure in the apparatus), both the valves 12 and 13 are opened, the inlet valve 12 to fully open position, and the outlet valve 13 preferably (although not necessarily) to somewhat less than fully open position (as shown in Fig. 3) to permit a slow but sufficient flow of dough while retaining the pressure condition (of developer 8 and pipe 7) within the dough stream. Then after a sample of dough flows through the chamber and begins to come out the outlet 11, the valve 13 is closed and immediately thereafter valve 12 is also closed. Thereupon the plunger 16 is manually pushed in as far as it will go and a reading taken of the distance of travel of the plunger. This reading may be so calibrated as to indicate the percentage of free gas by volume of the sample of dough tested. The end point of the movement of the plunger is defined and positive since it is caused by the applied pressure driving all free gas into solution, and the pressure is then exerted against the gas-free, incompressible dough sample so that the plunger movement is sharply and definitely arrested. Both valves are then opened wide, if desired, to discharge the sample, and closed for continuing normal operation of the dough mixing apparatus; thereafter, the operation may be repeated as desired.

Although, as will now be apparent, other means may be used to indicate the distance of travel of the plunger (such as a pointer attached to the handle 18 and moving along a suitable stationary scale), the scale 19 marked on the plunger shaft and read against the outer end of the bushing 20 is structurally simple and amply accurate for most purposes.

Although one specific embodiment of the invention has been set forth, it will be apparent to those skilled in the art that many other means of accomplishing the present invention might be used, in accordance with its principles as herein described.

I claim:

1. A device for measuring the percentage of free gas in a large mass of dough which contains distributed free gas and which is confined under pressure, which comprises means including dough sample receiving means, for confining said sample at substantially the same pressure and gas content as said mass, means for compressing said sample until all free gas is driven into solution, and means for measuring the reduction in volume of said sample in terms of percentage of the original volume of said sample, said compressing means consisting of structure movable to reduce the volume of said confining means and said confining means consisting of dough-impermeable structure rigid and positionally fixed against pressure of the confined dough.

2. A device for determining the volume of free gas in a dough which comprises chamber means for confining a portion of said dough, valve means for sealing in said portion confined in said chamber means, plunger means for compressing said sealed-in portion, and means for detecting the amount of motion of said plunger, said chamber means consisting of dough-impermeable structure rigid and positionally fixed against pressure of dough confined and sealed therein, and said plunger means constituting the sole structure movable relative to the dough sealed inside the chamber means.

3. A device for determining the volume of free gas in a large mass of dough which contains distributed free gas and which is confined under pressure, which comprises a chamber communicating with said mixture whereby some of said mixture will flow into and through said chamber along a predetermined path therein, two valves for sealing off a sample of said mixture at substantially the same pressure and gas content as said mixture, said valves being disposed at opposite ends of the path of flow of dough through said chamber, and said chamber being internally shaped to limit its dough-receiving space to said path of flow, a plunger arranged to be pushed into said chamber so as to drive the free gas therein into solution under pressure, and means to indicate the distance said plunger travels before being arrested by said compressed mixture.

4. In combination, with means enclosing a body of dough containing free gas distributed therein, a device for detecting the content of free gas in said dough, comprising chamber means communicating with said first mentioned means and having valve means, for receiving and confining a sample of said dough and plunger means movable into said chamber means for compressing the gas-containing sample therein, said plunger means having means for detecting its displacement, said chamber means being arranged to provide for flow of received dough into and through the same along a predetermined path and consisting of dough-impermeable structure rigid and positionally fixed against pressure of confined dough, said structure being shaped to limit the dough-receiving space of the chamber means to said path of flow, said valve means consisting of a pair of valves respectively at opposite ends of the path of flow of dough through said chamber means, for sealing the dough sample therein, and said plunger means constituting the sole structure movable relative to the sealed dough sample inside the chamber means.

References Cited in the file of this patent

UNITED STATES PATENTS

| | | |
|---|---|---|
| 2,138,141 | Cromer et al. | Nov. 29, 1938 |
| 2,141,977 | Gray | Dec. 27, 1938 |
| 2,327,642 | Horner | Aug. 24, 1943 |
| 2,352,835 | Hertel | July 4, 1944 |
| 2,434,723 | Shook | Jan. 20, 1948 |
| 2,534,489 | Webber et al. | Dec. 19, 1950 |